(12) United States Patent
Chen et al.

(10) Patent No.: US 12,360,047 B2
(45) Date of Patent: Jul. 15, 2025

(54) CHARACTERISTIC INFORMATION EXTRACTION METHOD AND PORTABLE DETECTION SYSTEM FOR SMALL-MOLECULE VOLATILE SUBSTANCES

(71) Applicant: JIANGSU UNIVERSITY, Zhenjiang (CN)

(72) Inventors: Quansheng Chen, Zhenjiang (CN); Huanhuan Li, Zhenjiang (CN); Qin Ouyang, Zhenjiang (CN); Jiaji Zhu, Zhenjiang (CN); Yi Xu, Zhenjiang (CN); Tianhui Jiao, Zhenjiang (CN); Haihui Pan, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 220 days.

(21) Appl. No.: 18/309,578

(22) Filed: Apr. 28, 2023

(65) Prior Publication Data
US 2023/0266249 A1    Aug. 24, 2023

Related U.S. Application Data

(63) Continuation of application No. PCT/CN2021/104632, filed on Jul. 6, 2021.

(51) Int. Cl.
*G01N 21/65*    (2006.01)
*G01N 21/01*    (2006.01)
(Continued)

(52) U.S. Cl.
CPC .......... *G01N 21/658* (2013.01); *G01N 21/03* (2013.01); *G06N 3/045* (2023.01); *G06N 3/08* (2013.01);
(Continued)

(58) Field of Classification Search
CPC .............. G01N 21/658; G01N 21/03; G01N 2021/0131; G01N 2021/0325;
(Continued)

(56) References Cited

U.S. PATENT DOCUMENTS

2006/0250613 A1* 11/2006 Demuth .............. G01N 21/658
356/301
2012/0322086 A1* 12/2012 Garnier ............ G01N 33/54389
435/7.25
(Continued)

FOREIGN PATENT DOCUMENTS

CN    106290296 A  *  1/2017    .......... G01N 21/658
CN    108375566 A     8/2018
(Continued)

OTHER PUBLICATIONS

Sun, Hongzhao, et al. "Metal-organic frameworks as surface enhanced Raman scattering substrates with high tailorability." Journal of the American Chemical Society 141.2 (2018): 870-878 (Year: 2018).*
(Continued)

*Primary Examiner* — Dominic J Bologna

(57) ABSTRACT

A characteristic information extraction method of a small-molecule volatile substance, including: dividing a surface-enhanced Raman scattering (SERS) spectrum of the small-molecule volatile substance to obtain n wavelength subintervals, where n is a positive integer; sampling the n wavelength subintervals through weighted bootstrap sampling (WBS) to obtain W wavelength subintervals, where W is a positive integer less than n; and screening the W wavelength subintervals to obtain desired wavelength subintervals. This application also provides a rapid detection method and a portable detection system of a small-molecule volatile substance.

11 Claims, 11 Drawing Sheets

(51) Int. Cl.
  *G01N 21/03* (2006.01)
  *G06N 3/045* (2023.01)
  *G06N 3/08* (2023.01)
(52) U.S. Cl.
  CPC ........... *G01N 2021/0131* (2013.01); *G01N 2021/0325* (2013.01); *G01N 2201/06113* (2013.01); *G01N 2201/0638* (2013.01); *G01N 2201/0683* (2013.01); *G01N 2201/0697* (2013.01); *G01N 2201/129* (2013.01)
(58) Field of Classification Search
  CPC . G01N 2201/06113; G01N 2201/0638; G01N 2201/0683; G01N 2201/0697; G01N 2201/129; G06N 3/045; G06N 3/08
  See application file for complete search history.

(56) References Cited

U.S. PATENT DOCUMENTS

| | | | | |
|---|---|---|---|---|
| 2016/0377628 | A1* | 12/2016 | Bansal | G01N 33/48707 436/501 |
| 2020/0158646 | A1* | 5/2020 | Tsen | G01N 1/34 |
| 2020/0232923 | A1* | 7/2020 | Liu | G01N 21/658 |
| 2021/0156804 | A1 | 5/2021 | Asthana et al. | |

FOREIGN PATENT DOCUMENTS

| | | |
|---|---|---|
| CN | 109650325 A | 4/2019 |
| CN | 109993155 A | 7/2019 |
| CN | 111122536 A | 5/2020 |
| CN | 111863147 A | 10/2020 |

OTHER PUBLICATIONS

Zhu, Jiaji, et al. "Interval combination iterative optimization approach coupled with SIMPLS (ICIOA-SIMPLS) for quantitative analysis of surface-enhanced Raman scattering (SERS) spectra." Analytica Chimica Acta 1105 (2020): 45-55 (Year: 2020).*

Eriksson, Lennart, et al. "Orthogonal signal correction, wavelet analysis, and multivariate calibration of complicated process fluorescence data." Analytica Chimica Acta 420.2 (2000): 181-195 (Year: 2000).*

Zhu, Jiaji, et al. "Rapid on-site identification of pesticide residues in tea by one-dimensional convolutional neural network coupled with surface-enhanced Raman scattering." Spectrochimica Acta Part A: Molecular and Biomolecular Spectroscopy 246 (2021): 118994 (Year: 2021).*

English machine translation of CN-106290296-A (Year: 2017).*

Jiaji Zhu et al., "Interval combination iterative optimization approach coupled with SIMPLS (ICIOA-SIMPLS) for quantitative analysis of surface-enhanced Raman scattering (SERS) spectra", Analytica Chimica Acta, vol. 1105, Jan. 10, 2020, pp. 1-10.

Jiaji Zhu et al., "Rapid on-site identification of pesticide residues in tea by one-dimensional convolutional neural network coupled with surface-enhanced Raman scattering", Spectrochimica Acta Part A: Molecular and Biomolecular Spectroscopy, vol. 246, Sep. 25, 2020, pp. 1-27.

Hongzhao Sun et al., "Metal-organic frameworks as SERS substrates with high tailorability", Journal of the American Chemical Society, 2018, pp. 1-18.

Zhongzheng Wang Ed., "Certified Public Equipment Engineer Licensing Examination Basic Exam Review Course vol. 2", May 31, 2007, Entire document.

Shuqing Wang Ed, "Nitrates and nitrites in food", Sep. 30, 2016, Entire document.

* cited by examiner

CHARACTERISTIC INFORMATION EXTRACTION METHOD AND PORTABLE DETECTION SYSTEM FOR SMALL-MOLECULE VOLATILE SUBSTANCES

CROSS-REFERENCE TO RELATED APPLICATIONS

This application is a continuation of International Patent Application No. PCT/CN2021/104632, filed on Jul. 6, 2021, which claims the benefit of priority from Chinese Patent Application No. 202110730403.1, filed on Jun. 29, 2021. The content of the aforementioned application, including any intervening amendments thereto, is incorporated herein by reference in its entirety.

TECHNICAL FIELD

This application relates to detection technologies, and more particularly to a characteristic information extraction method and a portable detection system for small-molecule volatile substances.

BACKGROUND

Scattering will happen when light strikes a substance. When scattering occurs, most scattered light remains unchanged in wavelength, and such scattering with no change in wavelength is called Rayleigh scattering; whereas a small part of the scattered light may experience an increase or decrease in wavelength, and this scattering with wavelength change is called Raman scattering, whose corresponding spectrum is called Raman spectrum. Since every substance has its own characteristic Raman spectrum, the Raman spectrum can be employed as a "fingerprint" for identifying substances.

Currently, the identification of a small-molecule volatile substance is performed by: obtaining a surface-enhanced Raman scattering (SERS) spectrum of the small-molecule volatile substance; matching the SERS spectrum of the small-molecule volatile substance with the SERS spectrum of a known substance; estimating if a similarity degree between the SERS spectrum of the small-molecule volatile substance and the SERS spectrum of the known substance exceeds a similarity threshold; and if yes, determining that the small-molecule volatile substance is the known substance. During the SERS spectrum matching process, it is required to sample the SERS spectrum. Traditionally, the SERS spectrum is divided into n (n is a preset number) wavelength subintervals based on a preset width. During the sampling of the SERS spectrum, there is no correlation between adjacent two sampling results, so that the sampling results will converge to a local minimum. Consequently, it is likely to ignore valuable light waves during sampling, resulting in poor identification accuracy of small-molecule volatile substances.

SUMMARY

An objective of this application is to provide a characteristic information extraction method and a portable detection system for small-molecule volatile substances, so as to overcome the problem in the prior art that during the sampling, there is no correlation between adjacent two sampling results, so that the sampling results will converge to the local minimum, and thus it is likely to miss some valuable light waves, resulting in low identification accuracy of small-molecule volatile substances.

Technical solutions of this application are described as follows.

In a first aspect, this application provides a characteristic information extraction method of a small-molecule volatile substance, comprising:

(1) generating a pulse laser, by a light source, to form a laser beam, and focusing the laser beam on the small-molecule volatile substance;

(2) receiving and processing laser beam scattered by the small-molecule volatile substance to obtain a surface-enhanced Raman scattering (SERS) spectrum of the small-molecule volatile substance;

(3) dividing the SERS spectrum of the small-molecule volatile substance to obtain n wavelength subintervals; wherein n is a positive integer;

(4) sampling the n wavelength subintervals through weighted bootstrap sampling (WBS) to obtain W wavelength subintervals; wherein W is a positive integer less than n; and (5) screening the W wavelength subintervals to obtain desired wavelength subintervals.

In some embodiments, the step of "screening the W wavelength subintervals to obtain desired wavelength subintervals" comprises:

based on the W wavelength subintervals, establishing W fitting results respectively corresponding to the W wavelength subintervals, and calculating an evaluation parameter of each of the W fitting results;

selecting σ*W fitting results from the W fitting results in an order from smallest to largest;

calculating a weight of each of the n wavelength subintervals through the following equation:

$$P_i = \frac{D_i}{\sigma * W};$$

wherein $P_i$ represents a weight of an i-th wavelength subinterval; Di represents a frequency of the i-th wavelength subinterval appearing in the σ*W fitting results; σ is a preset ratio; and i=1, 2, . . . , n;

according to current weights of the n wavelength subintervals, updating weights of the n wavelength subintervals obtained in a previous WBS;

averaging σ*W evaluation parameters of the σ*W fitting results to obtain a current average value;

comparing the current average value with an average value obtained in the previous WBS; and if the current average value is less than the average value obtained in the previous WBS, returning to the step (4); otherwise, taking wavelength subintervals of the σ*W fitting results corresponding to the current average value as the desired wavelength subintervals.

In some embodiments, the characteristic information extraction method further comprises: pre-processing the SERS spectrum obtained in step (2) by means of a method comprising wavelet analysis, adaptive filtering, orthogonal signal correction and differential processing.

In a second aspect, this application provides a rapid detection method for a small-molecule volatile substance, comprising:

(1) generating a pulse laser, by a light source, to form a laser beam, and focusing the laser beam on the small-molecule volatile substance;

(2) receiving and processing laser beam scattered by the small-molecule volatile substance to obtain a surface-enhanced Raman scattering (SERS) spectrum of the small-molecule volatile substance;

(3) dividing the SERS spectrum of the small-molecule volatile substance to obtain n wavelength subintervals; wherein n is a positive integer;

(4) sampling the n wavelength subintervals through weighted bootstrap sampling (WBS) to obtain W wavelength subintervals; wherein W is a positive integer less than n;

(5) screening the W wavelength subintervals to obtain a desired wavelength subset; and (6) inputting the desired wavelength subset into an estimation model to construct a mathematical relationship between content of the small-molecule volatile substance and the desired wavelength subset.

In some embodiments, the rapid detection method further comprises: pre-processing the SERS spectrum obtained in step (2) by means of a method comprising wavelet analysis, adaptive filtering, orthogonal signal correction and differential processing.

In some embodiments, the step of "inputting the desired wavelength subset into an estimation model to construct a mathematical relationship between content of the small-molecule volatile substance and the desired wavelength subset" comprises:

establishing the estimation model for the desired wavelength subset and the content of the small-molecule volatile substance to obtain an initial mathematical relationship; and verifying whether the initial mathematical relationship satisfies a predetermined condition; if yes, obtaining a trained mathematical relationship.

In some embodiments, the trained mathematical relationship is obtained through a training that adopts an adaptive moment estimation algorithm with a cross-entropy loss function as an objective function, and the objective function is:

$$O = \frac{1}{M}\sum_{m=1}^{M}\left[X_m \log \tilde{X}_m + (1-X_m)\log(1-\tilde{X}_m)\right] + \partial \|\theta\|^2;$$

wherein M indicates the number of samples; $X_m$ represents a target category; $\tilde{X}_m$ represents a predicted category; $\partial$ indicates a regularization coefficient; and $\theta$ indicates a weight.

In a third aspect, this application provides a rapid detection system for a small-molecule volatile substance, comprising:

a surface-enhanced Raman scattering (SERS) response medium;

a reaction device;

a Raman spectrum detection device; and a server, wherein the SERS response medium is configured to enhance a Raman scattering intensity of the small-molecule volatile substance;

the reaction device is configured to allow the small-molecule volatile substance and the SERS response medium to react thereon;

the Raman spectrum detection device is configured to collect a SERS spectrum of the small-molecule volatile substance after a reaction between the small-molecule volatile substance and the SERS response medium, and send the SERS spectrum to the server; and the server is signally connected to the Raman spectrum detection device; and the server is configured to perform the rapid detection method mentioned above.

In some embodiments, the rapid detection system further comprises a terminal;

wherein the terminal is signally connected to the server; the terminal is configured to send a query request to the server for a detection result of the small-molecule volatile substance; the server is configured to generate a query result according to the query request, and send the query result to the terminal; and the terminal is further configured to display the detection result of the small-molecule volatile substance according to the query result.

In some embodiments, a SERS spectrum cloud analysis platform is established on the server; the SERS spectrum cloud analysis platform is configured to store the SERS spectrum and a source program of the rapid detection method; the server is configured to provide an internet protocol (IP) address and a listening port for the terminal to request access, so as to allow the terminal to query historical SERS spectrum data and update the source program of the rapid detection method from the SERS spectrum cloud analysis platform via the IP address and the listening port.

In some embodiments, the SERS response medium is a photoinduced bridged complex; the photoinduced bridged complex comprises a bridging ligand and a metal ion; and the bridging ligand has a reaction site for the metal ion. The bridged complex is subjected to shaping processing by using a photoinduction technique to obtain a SERS response medium with special pattern, size and morphology.

In some embodiments, the reaction device comprises:

a base film; and a hydrophobic layer;

wherein the base film is configured to receive the small-molecule volatile substance and the SERS response medium at different zones of the base film; the hydrophobic layer is configured to guide the small-molecule volatile substance and the SERS response medium to a reaction position on the base film, so as to allow the small-molecule volatile substance and the SERS response medium to react on the reaction position.

In some embodiments, the base film comprises a first zone, a second zone and a third zone; wherein the first zone and the second zone are connected to the third zone;

the first zone is configured to absorb the small-molecule volatile substance dropwise added thereto; the second zone is configured to absorb the SERS response medium dropwise added thereto; first sides of the first zone, the second zone and the third zone are covered by the hydrophobic layer such that the small-molecule volatile substance in the first zone and the SERS response medium in the second zone are guided to the third zone for reaction; second sides of the first zone, the second zone and the third zone are not covered by the hydrophobic layer, such that the small-molecule volatile substance is dropwise added to a second side of the first zone, and the SERS response medium is dropwise added to a second side of the second zone.

In some embodiments, the first zone, the second zone, and the third zone of the base film are arranged in a triangular shape.

In some embodiments, the transient velocity distribution, steady-state velocity distribution, and particle distribution of contact between the small-molecule volatile substance and the SERS response medium are simulated by using a fluid processing field software to evaluate change rate and uniformity of reaction between the small-molecule volatile substance and the SERS response medium under different contact ways.

Compared with the prior art, this application has the following beneficial effects.

In this application, the SERS spectrum of the small-molecule volatile substance is divided into n wavelength subintervals, which are sampled through weighted bootstrap sampling (WBS) to obtain W wavelength subintervals. A desired wavelength subset is obtained based on the desired wavelength subintervals. By means of the WBS, this application can ensure that the wavelength subintervals of the SERS spectrum will still be evaluated in the next iteration, so as to enable the correlation between results of adjacent two samplings, and avoid converging to a local minimum. In this way, the valuable light waves can be accurately sampled, allowing for improved detection accuracy of small-molecule volatile substances.

BRIEF DESCRIPTION OF THE DRAWINGS

In order to clearly explain the technical solutions in the embodiments of the present application or the prior art, the drawings that needed to be used in the description of the embodiments or the prior art will be briefly described below. Obviously, illustrated in the drawings are merely some embodiments of the present application, and for those of ordinary skill in the art, other drawings can be obtained based on these drawings without paying creative effort.

DETAILED DESCRIPTION OF EMBODIMENTS

Figure 1:
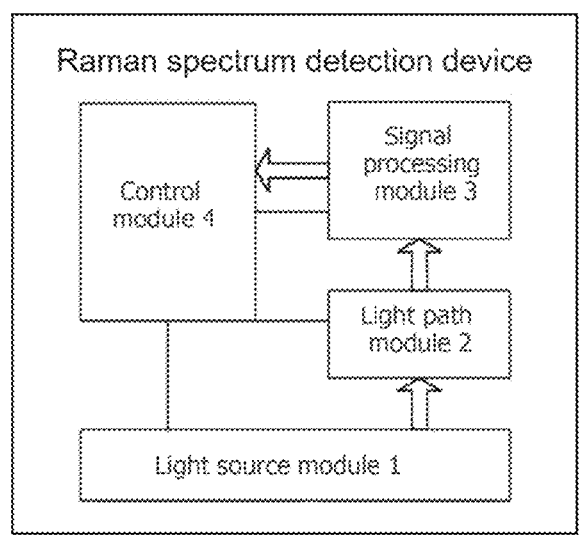
FIG. 1 is a structural block diagram of a Raman spectrum detection device according to an embodiment of this application.

Technical solutions of this application will be clearly and completely described below with reference to the accompanying drawings and embodiments. Obviously, described below are merely some embodiments, and are not intended to limit this application. Other embodiments obtained by those of ordinary skill in the art based on the embodiments provided herein without paying creative effort shall fall within the scope of the present disclosure defined by the appended claims.

It should be noted that as used herein, directional indications (such as up, down, left, right, front and back) are merely intended to explain the relative position relationship and movement situation among individual components in a specific posture (as shown in the accompanying drawings). If the specific posture changes, the directional indication changes accordingly.

In addition, relational terms such as "first" and "second" are merely used for description, and cannot be understood as indicating or implying their relative importance or the number of indicated technical features. Thus, the features defined with "first" and "second" may explicitly or implicitly include at least one of the features. Additionally, "and/or" in the disclosure includes three solutions. For example, "A and/or B" includes technical solution A, technical solution B, and a combination thereof. Additionally, technical solutions of various embodiments can be combined on the premise that the combined technical solution can be implemented by those skilled in the art. When the combination of technical solutions is contradictory or cannot be implemented, it should be considered that such a combination of technical solutions does not exist, nor does it fall within the scope of the present disclosure.

As used herein, the term "small-molecule volatile substance" refers to a substance, which has a relative molecular weight ranging from 15 to 500 Da, and is in a gaseous state at room temperature. The volatility refers to the transformation of a liquid substance into a gaseous state at a temperature below its boiling point, and the escape of the volatile gaseous solute from the solution system. In some embodiments, the small-molecule volatile substances can be hydrogen sulfide ($H_2S$), ethyl acetate ($C_4H_8O_2$), ammonia ($NH_3$), ethanol ($C_2H_6O$) or acetic acid ($C_2H_4O_2$).

Embodiment 1

Provided herein is a rapid detection system of a small-molecule volatile substance, which includes a surface-enhanced Raman scattering (SERS) response medium, a reaction device, a Raman spectrum detection device and a server. The SERS response medium is configured to enhance a Raman scattering intensity of the small-molecule volatile substance. The reaction device is configured to allow the small-molecule volatile substance and the SERS response medium to react thereon. The Raman spectrum detection device is configured to collect a SERS spectrum of the small-molecule volatile substance after a reaction between the small-molecule volatile substance and the SERS response medium. The server is signally connected to the Raman spectrum detection device. The server is configured to perform a rapid detection method of the small-molecule volatile substance. The Raman spectrum detection device is configured to send the SERS spectrum to the server. The server is configured to receive the SERS spectrum sent by the Raman spectrum detection device, and input the SERS spectrum into the rapid detection method, so as to obtain content of the small-molecule volatile substance corresponding to the SERS spectrum.

The Raman spectrum detection device and the server are designed to be decoupled. The Raman spectrum detection device is configured to collect the SERS spectrum of the small-molecule volatile substance, and upload the SERS spectrum of the small-molecule volatile substance to the server in real time. The server is configured to obtain detection results of the content of the small-molecule volatile substance according to the SERS spectrum of the small-molecule volatile substance, which effectively solves the problem caused by difficult spectral modeling and long modeling time for field personnel, thus making the operations of the detection system simpler and more intelligent.

It can be understood that the SERS spectrum denotes surface enhanced Raman scattering spectrum.

The SERS response medium is a photoinduced bridged complex; the photoinduced bridged complex comprises a bridging ligand and a metal ion; and the bridging ligand has a reaction site for the metal ion. The bridging ligand has a geometrically variable configuration, and the bonding of ligand bonds on the bridging ligand can construct a diverse topology with high porosity. Through the excellent porous mass transfer channels of the bridging ligand, the metal ions can be precisely fabricated to the reaction sites of the bridging ligand to obtain the photoinduced bridged complex. In this case, the efficiency of the SERS response medium for the adsorption of small-molecule volatile substance is improved.

The photoinduced bridged complex is subjected to shaping processing by using a photoinduced technique, to obtain a SERS response medium with a special pattern, size and morphology. By using the photoinduced technique, the bridged complex exhibits a change in properties under the action of light and high temperature, so as to obtain the SERS response mediums with special patterns, sizes and shapes. Moreover, the SERS response medium can be produced quickly, efficiently and in batches. Moreover, the produced SERS response medium have stable properties. The SERS response medium has open metal sites, high porosity and quantum tunneling effect, which improves the efficiency of the SERS response medium in adsorbing small-molecule volatile substance.

In this embodiment, the SERS response medium is obtained through a method for preparing the SERS response medium, which is performed through the following steps.

Metal ions were taken as metal clusters, and derivatives with different groups of substitution pairs were taken as ligands. Because the bridging ligands have geometrically variable configurations. Diverse topologies with high porosity were constructed through the bonding of ligand bonds of bridging ligands, and the metal ions were precisely fabricated to the reaction sites of the derivatives with different groups of substitution pairs through the excellent porous mass transfer channels of bridging ligands, so as to obtain the photoinduced bridged complexes.

The bridging ligand has adjustable length and flexible structure, and thus can be regulated to synthesize various photoinduced bridged complexes varying in morphology, pore size and adsorption property for small-molecule volatile substances.

By using the photoinduced techniques, the photoinduced bridged complex exhibits a change in properties under the action of light and high temperature, so as to obtain the SERS response mediums with special patterns, sizes and shapes.

The SERS response medium is configured to simulate the interaction between small-molecule volatile substance and metal ions by using an adsorption site model. By studying the enhancement factors of the Raman spectrum, based on the experimental results, the pre-resonance Raman spectra of the small-molecule volatile substances under the resonance excitation of simulated charge transfer is calculated, and the spectral enhancement mechanism of the small-molecule volatile substance is analyzed, thereby determining the effective information peaks of the small-molecule volatile substance.

The rapid detection system further includes a terminal. The terminal is signally connected to the server. The terminal is configured to send a query request to the server for a detection result of the small-molecule volatile substance. The server is configured to generate a query result according to the query request, and send the query result to the terminal. The terminal is further configured to display the detection result of the small-molecule volatile substance according to the query result. The rapid detection system is more applicable to ordinary users in operation, and can solve the problems of limited resources of terminal hardware in processing and calculating complex data, the difficulties in establishment of mathematical relations on site, and inability to share mathematical relations, and low reuse rate simultaneously.

In this embodiment, the terminal may be a cell phone, a tablet computer, a desktop computer or a laptop computer.

In this embodiment, the server includes a SERS spectrum cloud analysis platform. The SERS spectrum cloud analysis platform is configured to store the SERS spectrum and a source program of the rapid detection method. The server is configured to provide an internet protocol (IP) address and a listening port for the terminal to request access, so as to allow the terminal to query historical SERS spectrum data and update the source program of the rapid detection method from the SERS spectrum cloud analysis platform via the IP address and the listening port. The SERS spectrum cloud analysis platform enables uniform updating of rapid detection methods, such that there is no need to update each Raman spectrum detection device, thereby improving the updating efficiency of the rapid detection methods.

Figure 11:
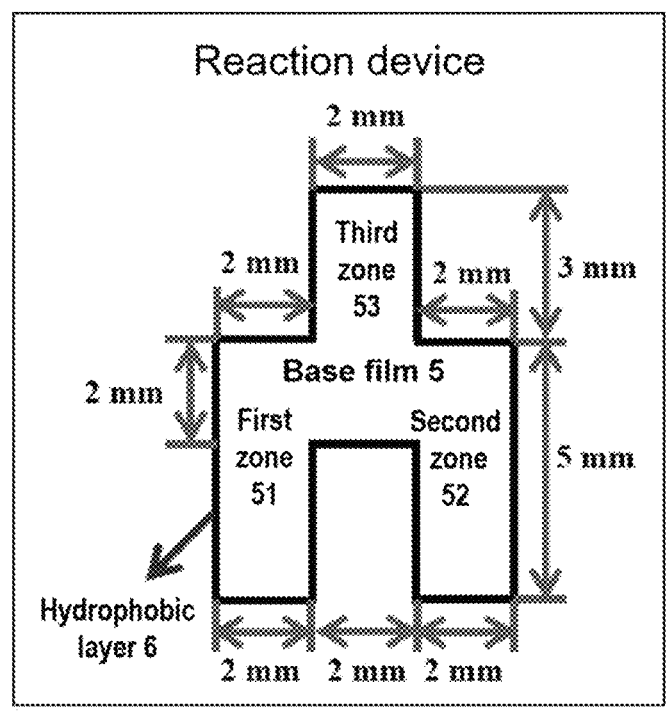
FIG. 11 is a structural diagram of a reaction device according to an embodiment of this application.

Referring to an embodiment shown in FIG. 11, the reaction device includes a base film 5 and a hydrophobic layer 6. The base film 5 includes a first zone 51, a second zone 52 and a third zone 53. The first zone 51, the second zone 52 and the third zone 53 are arranged in a triangular shape. First sides of the first zone 51, the second zone 52 and the third zone 53 are covered by the hydrophobic layer 6. Second sides of the first zone 51, the second zone 52 and the third zone 53 are not covered by the hydrophobic layer, such that the small-molecule volatile substance and the SERS response medium are dropwise added to the second sides of the first zone and second zone, respectively and reacted thereon. In a closed system, the small-molecule volatile substance and the SERS response medium are added dropwise to different zones on the base film 5, e.g., first zone 51 and second zone 52, respectively. The hydrophobic layer 6 is configured to guide the small-molecule volatile substance and the SERS response medium to a reaction zone of the base film, e.g., third zone 53.

In some embodiments, the reaction device is a paper-based microfluidic chip. The first zone 51, the second zone 52 and the third zone 53 of the base film each include a paper-based microfluidic hydrophilic channel. The hydrophobic layer is wrapped on each of the first zone 51, the second zone 52 and the third zone 53, and is configured as a hydrophobic barrier to reduce a transmission loss of the small-molecule volatile substance and the SERS response medium in the paper-based microfluidic chip. Unlike general substance solutions, small-molecule volatile substances are volatile. Thus, it is necessary to ensure the adsorption amount and efficiency of small-molecule volatile substances, so as to achieve accurate and fast detection of the small-molecule volatile substances. With the guidance and convergence of the hydrophobic layer, the reactants are reacted in a zone different from the zones where the reactants are drop added, thereby enhancing the binding between the SERS response medium and the small-molecule volatile substance. Under this circumstance, the Raman signal and detection sensitivity are enhanced. FIG. 11 also schematically illustrates the arrangement and dimensions of the first zone 51, the second zone 52 and the third zone 53.

In some embodiments, the transient velocity distribution, steady-state velocity distribution, and particle distribution of contact between the small-molecule volatile substance and the SERS response medium are simulated by using a fluid processing field software to compare a change rate and uniformity of reaction between the small-molecule volatile substance and the SERS response medium under different contact ways. In this way, fast and efficient adsorption of the small-molecule volatile substance and the SERS response medium are realized.

In this embodiment, different configurations of SERS response media are taken as a molecular training set. The 3-dimensional quantitative structure activity relationship (3D-QSAR) pharmacophore model of the SERS response medium is constructed by using Discovery Studio software (Dassault Systemes BIOVIA). Based on a ligand-based pharmacophore model combined with the 3D-QSAR method, the common functional groups of the molecules in the molecular training set are clarified by a Hiphop module, which reveals the color development mechanism of the SERS response media with different configurations, and improves the efficiency of SERS response medium for adsorbing the small-molecule volatile substance, thereby enhancing the binding between the SERS response medium and the base film.

The ultraviolet-visible spectrophotometer is employed to collect the spectra of SERS response media reacting with each of solutions varying in concentration, obtain the specific absorption peak shifts before and after the solution reaction, and calculate the coordination number of the metal ion in the center of SERS response medium and the equilibrium constant of the coordination reaction. On this basis, the spectral dynamic analysis of the binding between the SERS response medium and the small-molecule volatile substance is performed to explore the binding mechanism between the SERS response medium and small-molecule volatile substance, providing a basis for improving the efficiency of SERS response medium for adsorbing the small-molecule volatile substance.

Referring to an embodiment shown in FIG. 1, the Raman spectrum detection device includes a light source module 1, a light path module 2, a signal processing module 3 and a control module 4. The control module 4 is in wire connection with the light source module 1, the light path module 2 and the signal processing module 3 to control the light source module 1, the light path module 2 and the signal processing module 3. The light source module 1 is configured to generate a pulse laser and transmit the pulse laser to the light path module 2. The light path module 2 is configured to receive and adjust the pulse laser to obtain a target circular beam, and focus the target circular beam to the small-molecule volatile substance. The small-molecule volatile substance scatters the target circular beam. The light scattered by the small-molecule volatile substance is the scattered light. The light path module 2 is configured to collect the scattered light, filter the scattered light to obtain a filtered-scattered light, and send the filtered-scattered light to the signal processing module 3. The signal processing module 3 is configured to receive and process the filtered-scattered light to obtain corresponding SERS spectrum data. The signal processing module 3 is configured to send the SERS spectrum data to the control module 4. The control module 4 is configured to receive and analyze the SERS spectrum data to obtain content of the small-molecule volatile substance.

Figure 2:
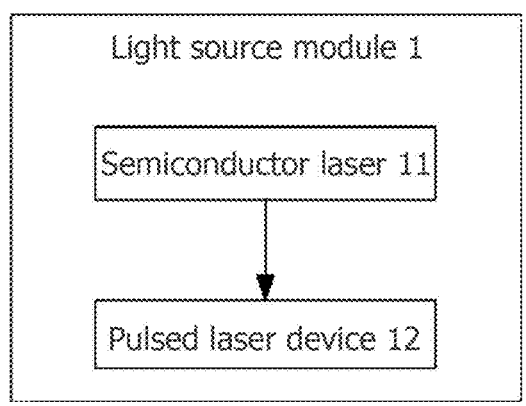
FIG. 2 is a structural block diagram of a light source module according to an embodiment of this application.

Referring to an embodiment shown in FIG. 2, the light source module 1 includes a semiconductor laser 11 and a pulsed laser device 12. The semiconductor laser 11 is configured to generate a seed laser light and inject the seed laser light into the pulsed laser device 12 via an optical fiber. The pulsed laser device 12 is configured to generate a pulse laser and transmit the pulse laser to the light path module 2.

The seed laser light generated by the semiconductor laser 11 is an ultra-narrow line-width continuous laser light. The seed laser light synchronously works with the pulsed laser device 12 via a corresponding control line. The effect caused by the synchronous operation of the seed laser light with the pulsed laser device 12 is that when the seed laser light is injected into the pulsed laser device 12, the monochromaticity of the pulse laser output from the pulsed laser device 12 is substantially improved and the energy is becoming more stable. If the seed laser light and the pulsed laser device 12 do not work synchronously, the seed laser light does not work during the output of the pulse laser from the pulsed laser device 12, resulting in a poor quality of the pulse laser output from the pulsed laser device 12.

In this embodiment, the semiconductor laser 11 is a narrow line-width distributed feedback laser. The narrow line-width distributed feedback laser is configured to output a seed laser light at a wavelength of 1064 nm. The pulsed laser device 12 is an yttrium aluminum garnet crystal laser. The yttrium aluminum garnet crystal laser is configured to generate a nanosecond pulse laser with a line-width ranging from 0.003 cm to 1 cm and at a wavelength of 1064 nm when the seed laser light is injected, and convert the nanosecond pulse laser to a narrow line-width nanosecond pulse laser at a wavelength of 532 nm via a frequency doubling crystal inside the yttrium aluminum garnet crystal laser.

Figure 3:
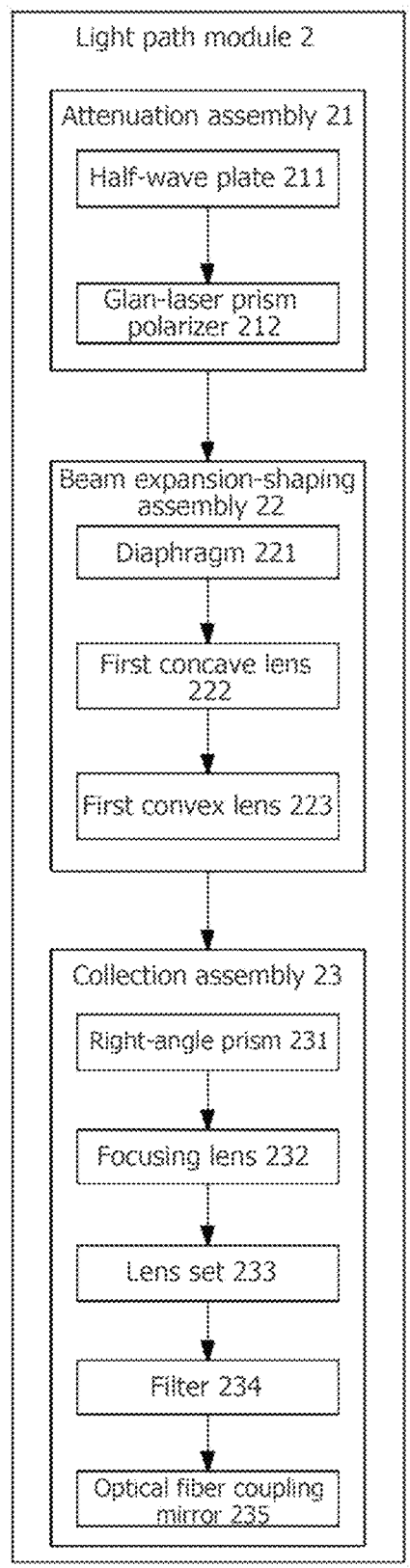
FIG. 3 is a structural block diagram of a light path module according to an embodiment of this application.

Referring to an embodiment shown in FIG. 3, the light path module 2 includes an attenuation assembly 21, a beam expansion-shaping assembly 22 and a collection assembly 23. The attenuation assembly 21 is configured to receive the pulse laser generated from the pulsed laser device 12, and adjust the energy of the pulse laser to obtain adjusted pulse laser. The attenuation assembly 21 is configured to transmit the adjusted pulse laser to the beam expansion-shaping assembly 22. The beam expansion-shaping assembly 22 is configured to receive and expand the adjusted pulse laser to obtain a target circular beam. The beam expansion-shaping assembly 22 receives and expands the adjusted pulse laser to obtain a target circular beam. The beam expansion-shaping assembly 22 is configured to transmit the target circular beam to the collection assembly 23. The collection assembly 23 is configured to receive the target circular beam, and focus the target circular beam on the small-molecule volatile substance. The small-molecule volatile substance scatters the target circular beam to obtain the scattered light. The collection assembly 23 is configured to collect the scattered light, and filter the scattered light to obtain filtered-scattered light. The collection assembly 23 is configured to transmit the filtered-scattered light to the signal processing module 3. In practical use, the user can adjust the beam expansion-shaping assembly 22 and the collection assembly 23 according to the experimental environments to achieve laser focusing of the light path module 2 within the range of 0.5 m to 3 m, and realize the spatial resolution of the light path module 2 within the range of 1 mm to 10 mm.

It should be noted that the size range of the effectively-detected small-molecule volatile substance is the spatial resolution of the Raman spectrum detection device. The spatial resolution represents the ability of the Raman spectrum detection device to distinguish the small-molecule volatile substances in different size ranges.

In this embodiment, the attenuation assembly 21 includes a Glan-laser prism polarizer 212 and a half-wave plate 211. The half-wave plate 211 is rotatable. The half-wave plate 211 is configured to receive the pulse laser generated from the pulsed laser device 12, change a polarization angle of the pulse laser to obtain a changed pulse laser, and send the changed pulse laser to the Glan-laser prism polarizer 212. The Glan-laser prism polarizer 212 is configured to receive the changed pulse laser, split the changed pulse laser to obtain horizontally-polarized light, and send the horizontally-polarized light to the beam expansion-shaping assembly 22.

In an embodiment, the Glan-laser prism polarizer 212 is configured as a polarization analyzer, which is capable of splitting the changed light into transmittable horizontally-polarized light (e light) and reflectable vertically-polarized light. The half-wave plate 211 is configured to change the polarization angle of the pulse laser by adjusting a ratio of the horizontally-polarized light in the pulse laser, so as to control the energy of the transmitted light that passes through the Glan-laser prism polarizer 212, i.e., the energy of the horizontally-polarized light that passes through the Glan-laser prism polarizer 212.

In this embodiment, the half-wave plate 211 is mounted on a motorized rotation frame. The Glan-laser prism polarizer 212 is mounted on a fixed mirror frame. The control module 4 is configured to control the motorized rotation frame to adjust the angle of the half-wave plate 211 relative to the pulsed laser device 12, and the angle of the half-wave plate 211 relative to the Glan-laser prism polarizer 212, so as to adjust the ratio of the horizontally-polarized light in the pulse laser, and achieve continuous regulation of the energy of the horizontally-polarized light passing through the Glan-laser prism polarizer 212.

In this embodiment, the beam expansion-shaping assembly 22 includes a diaphragm 221, a first concave lens 222 and a first convex lens 223. The first concave lens 222 and the convex lens 223 are movable. The diaphragm 221 is configured to receive the horizontally-polarized light from the Glan-laser prism polarizer 212, filter the horizontally-polarized light to obtain a first circular light beam, and send the first circular light beam to the first concave lens 222. The first concave lens 222 is configured to receive and diverge the first circular light beam to obtain a second circular light beam, and send the second circular light beam to the first convex lens 223. The first convex lens 223 is configured to receive and adjust the second circular light beam to obtain a target circular light beam, and send the target circular light beam to the collection assembly 23.

In an embodiment, the diaphragm 221 refers to an entity that acts as a limiting factor for the light beam in the optical system and may be an edge of a lens, a frame or a specially-arranged perforated screen. The diaphragm 221 is configured to simultaneously filter the horizontally-polarized light to remove the stray light generated from the pulsed laser device 12 and the attenuation assembly 21, and filter out the weaker energy at the edges of the laser beam to obtain a first circular beam with clear edges and uniform intensity.

In this embodiment, the first concave lens 222 is a flat concave lens. The diaphragm 221 is mounted on a fixed bracket. The first concave lens 222 and the first convex lens 223 are mounted on a motorized translation table. The control module 4 is configured to control the motorized translation table. The motorized translation table is configured to adjust the relative distance between the first concave lens 222 and the first convex lens 223 to change the divergence angle of the target circular beam, and change the spot size of the laser light focused on the small-molecule volatile substance. In this way, the spatial resolution of the Raman spectrum detection device can be adjusted.

In this embodiment, the collection assembly 23 includes a right-angle prism 231, a focusing lens 232, a lens set 233, a filter 234 and an optical fiber coupling mirror 235. The right-angle prism 231 is configured to receive the target circular beam from the first convex lens 223, and reflect the target circular beam to the focusing lens 232. The focusing lens 232 is configured to receive the target circular beam, and focus the target circular beam on the small-molecule volatile substance. The small-molecule volatile substance scatters the target circular beam to obtain scattered light. The focusing lens 232 is configured to collect the scattered light, and send the scattered light to the lens set 233. The lens set 233 is configured to receive and adjust the scattered light to obtain a parallel beam. The lens set 233 is configured to send the parallel beam to the filter 234. The filter 234 is configured to receive the parallel beam, and filter the parallel beam to retain the Raman scattered light. The filter 234 is configured to send the Raman scattered light to the filter 234. The filter 234 is configured to send the Raman scattered light to optical fiber coupling mirror 235. The optical fiber coupling mirror 235 is configured to receive the Raman scattered light, and focus the Raman scattered light to the fiber port. The fiber coupling mirror 235 is configured to transmit the Raman scattered light to the signal processing module 3 via an optical fiber.

In an embodiment, the right-angle prism 231, the focusing lens 232, the lens set 233, the filter 234 and the fiber coupling mirror 235 are fixedly mounted in a caged optical path (i.e., the right-angle prism 231, the focusing lens 232, the lens set 233, the filter 234 and the fiber coupling mirror 235 are arranged coaxially). The right-angle prism 231 is arranged between the focusing lens 232 and the lens set 233. The right-angle prism 231 is much smaller than the focusing lens 232 and the lens set 233 in size, which avoids affecting the transmission of scattered light between the focusing lens 232 and the lens set 233. The target circular beam is reflected by the right-angle prism 231 and irradiated to the small-molecule volatile substance through the focusing lens 232. The small-molecule volatile substance scatters the target circular beam to obtain the scattered light, which includes Rayleigh scattered light and Raman scattered light. The focusing lens 232 is configured to re-collect the scattered light, and adjust the collected scattered light into a parallel beam through the lens set 233. The filter 234 is configured to filter the parallel beam to filter out and remove the Rayleigh scattered light, and retain the Raman scattered light.

In this embodiment, the focusing lens 232 is configured as both a focusing mirror for incident laser light of the small-molecule volatile substance, and a collecting mirror for the scattered light, which forms a back-scattered light path. The focusing lens 232 is preferably a lens with a focal length of 500 mm or 1000 mm and a diameter of 2 inches. The filter 234 is a long-wavelength pass filter 234, which is specially used for a laser light at a wavelength of 532 nm. The lens set 233 includes a second convex lens and a second concave lens. The scattered light is collected by the focusing lens 232 and converted into a near-parallel beam. The second convex lens focuses the near-parallel beam, which is then converted into parallel light by the second concave lens. The fiber coupling mirror 235 is preferably a third convex lens. The collimation degree and diameter of the parallel light matches the operating parameters of the filter 234.

Figure 4:
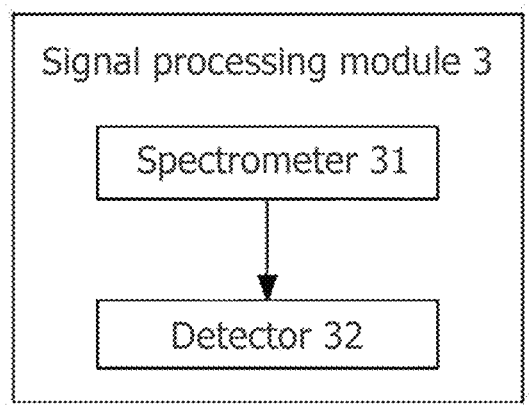
FIG. 4 is a structural block diagram of a signal processing module according to an embodiment of this application.

Referring to an embodiment shown in FIG. 4, the signal processing module 3 includes a spectrometer 31 and a detector 32. An inlet port of the spectrometer 31 is connected to the fiber coupling mirror 235 via an optical fiber for receiving and decomposing the Raman scattered light obtained from the fiber coupling mirror 235 to obtain spectral lines. The detector 32 is connected to the outlet port of the spectrometer 31 for detecting spectral lines to obtain SERS spectrum data, and sending the SERS spectrum data to the control module 4.

In an embodiment, the spectrometer 31 is configured to decompose the laser with complex composition into spectral lines according to different wavelengths. The detector 32 is configured to convert the spectral lines into SERS spectrum data according to the intensity of the laser light at different wavelengths. In this embodiment, the detector 32 is preferably a time-resolved intensified camera (TRiCAM) (Intensified charge coupled device, (ICCD)).

Figure 5:
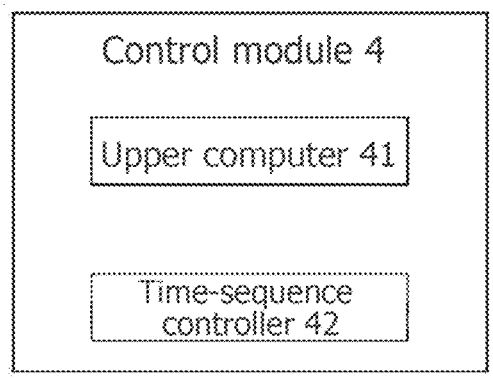
FIG. 5 is a structural block diagram of a control module according to an embodiment of this application.

As shown in FIG. 5, the control module 4 includes an upper computer 41. The upper computer 41 is connected to the pulsed laser device 12, the half-wave plate 211, the first concave lens 222, the first convex lens 223, the spectrometer 31 and the detector 32. The upper computer 41 is configured to adjust the pulsed laser device 12, the half-wave plate 211, the first concave lens 222, the first convex lens 223, the spectrometer 31, and the detector 32, and receive and analyze the SERS spectrum data sent from the detector 32 to obtain the content of the small-molecule volatile substance.

In an embodiment, the upper computer 41 is configured to adjust parameters of the pulsed laser device 12, the spectrometer 31 and the detector 32, control the rotation angle of the motorized rotation frame, and adjust the position of the motorized translation table, so as to control the rotation angle of the half-wave plate 211, and adjust the relative distance between the first concave lens 222 and the first convex lens 223. In this embodiment, the upper computer 41 is preferably a computer (PC). The upper computer 41 is configured to receive the SERS spectrum data from the detector 32 and analyze the SERS spectrum data to obtain the content of the small-molecule volatile substance.

In this embodiment, the control module 4 further includes a time-sequence controller 42. The time-sequence controller 42 is connected to the pulsed laser device 12 and the detector 32, and is configured to adjust the pulsed laser device 12 and the detector 32, so as to realize the synchronization between a pulse time sequence of the pulsed laser device 12 and a shutter time sequence of the detector 32.

In an embodiment, to allow the detector 32 to accurately capture the laser light without signal acquisition during the blanking period (no laser), it is required to ensure the synchronization between the working sequence of the pulsed laser device 12 and the working sequence of the detector 32 via the time-sequence controller 42. The time-sequence controller 42 is configured to send a signal indication to the pulsed laser device 12 and detector 32 respectively. The pulsed laser device 12 and detector 32 response at different times after receiving signal indication simultaneously. The pulse laser generated by the pulsed laser device 12 needs to be converted into spectral lines after a period of time, and transmitted to the detector 32. A delay time before the detector 32 opens the shutter is adjusted to make the shutter time of the detector 32 accurately cover the nanosecond width of the pulse laser. After appropriate adjustment, it can ensure that when the spectral lines reach the detector 32, the detector 32 begins to collect the spectral lines, and when there are no spectral lines, the shutter of the detector 32 closes. When the temperature of the small-molecule volatile substance is above about 800° C., the intensity of thermal radiation generated by the small-molecule volatile substance is sufficient to cause great interference to the spectral detection. However, in this application, by using the time-sequence control, the detection is achieved only when there are spectral lines, and no detection are performed during the large non-spectral-line blanking time, which prevents the detector 32 from collecting too much interference signal of thermal radiation.

In this embodiment, the time-sequence controller 42 is preferably a digital delay generator (DDG). The time-sequence controller 42 is configured to control the shutter time sequence of the detector 32 to be delayed for a certain time, such that the shutter time sequence is synchronized with the pulse time sequence of the pulsed laser device 12. In this way, the shutter times for the spectral line collections are limited to the nanosecond magnitude of the pulse laser width. By limiting the shutter times for the spectral line collections, the influence of the blackbody radiation signal generated by the small-molecule volatile substance at high temperatures on the spectral analysis can be effectively eliminated. In this way, the obtained information of the small-molecule volatile substance is more accurate and reliable, and the variations in composition and structure of the small-molecule volatile substance can be continuous measured at different temperatures.

Figure 6:
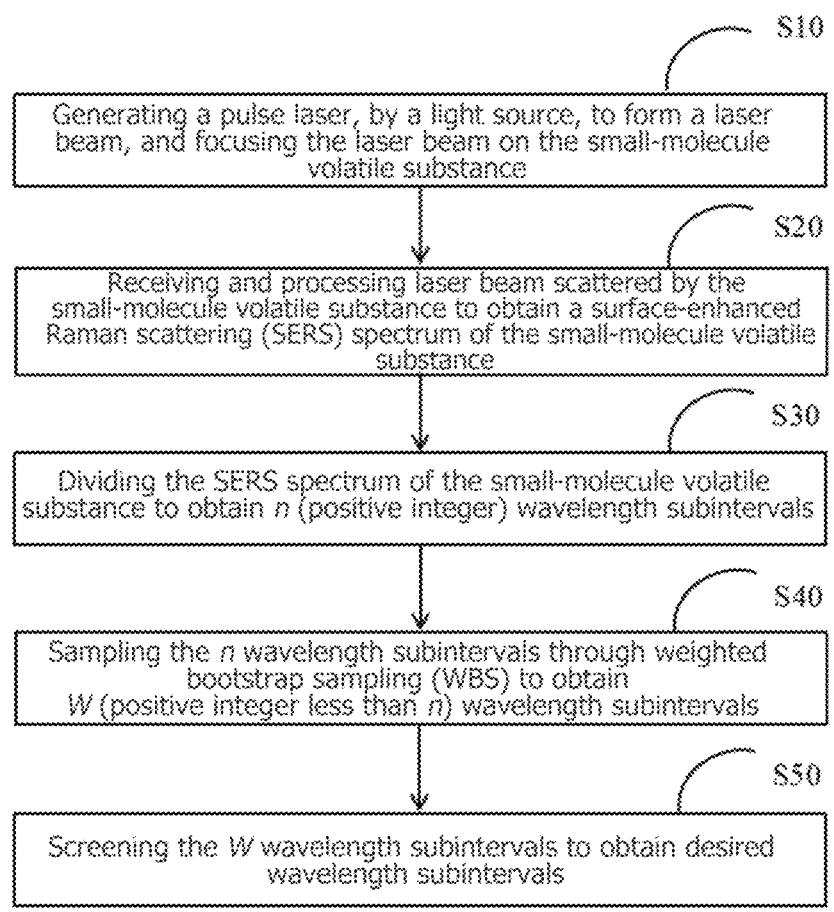
FIG. 6 is a flow chart of a characteristic information extraction method for a small-molecule volatile substance according to an embodiment of this application.

Referring to an embodiment shown in FIG. 6, a characteristic information extraction method of a small-molecule volatile substance is provided. The characteristic information extraction method is applied in a server, and is performed through the following steps.

(S10) A light source generates a pulse laser to form a laser beam, and focuses the laser beam on the small-molecule volatile substance.

(S20) Laser beam scattered by the small-molecule volatile substance is received and processed to obtain a surface-enhanced Raman scattering (SERS) spectrum of the small-molecule volatile substance.

(S30) The SERS spectrum of the small-molecule volatile substance is divided to obtain n wavelength subintervals, where n is a positive integer.

Specifically, the user collects the SERS spectrum of the small-molecule volatile substance via the Raman spectrum detection device and sends the collected SERS spectrum to the server. The server receives the SERS spectrum sent by the Raman spectrum detection device and divides the wavelength interval of the SERS spectrum into n equal-width wavelength subintervals.

(S40) The n wavelength subintervals are sampled through weighted bootstrap sampling (WBS) to obtain W wavelength subintervals, where W is a positive integer less than n.

Specifically, WBS is a random sampling method with put-back. Each time when WBS is executed, the object to be sampled is assigned a weight. If the weight is larger, it indicates that the probability of the object being sampled is also larger. The WBS is employed to sample n wavelength subintervals with equal width for n times (at a first iteration, each wavelength subinterval is sampled with a weight of 1/n). the wavelength subintervals that are sampled at least 1 time (the number of the wavelength subintervals is 0.632*n) are formed into a new wavelength subinterval. The WBS is repeated to obtain W wavelength subintervals.

(S50) The W wavelength subintervals are screened to obtain desired wavelength subintervals.

Referring to an embodiment shown in FIG. 7, step (S50) is specifically performed as follows.

(S51) Based on the W wavelength subintervals, W fitting results respectively corresponding to the W wavelength subintervals are established. An evaluation parameter of each of the W fitting result are calculated.

(S52) σ*W fitting results are selected from the W fitting results in an order from smallest to largest.

(S53) A weight of each of the n wavelength subintervals is calculated through the following equation:

$$P_i = \frac{D_i}{\sigma * W};$$

where $P_i$ represents a weight of an i-th wavelength subinterval; $D_i$ represents a frequency of the i-th wavelength subinterval appearing in the σ*W fitting results; σ is a preset ratio; and i=1, 2, ..., n.

(S54) According to current weights of the n wavelength subintervals, weights of the n wavelength subintervals obtained in a previous WBS is updated.

(S55) An average value of σ*W evaluation parameters is calculated to obtain a current average value.

(S56) The current average value is compared with an average value of evaluation parameters in the previous WBS. If the current average value is less than the average value obtained in the previous WBS, return to the step (S40). Otherwise, wavelength subintervals of the σ*W fitting results corresponding to the current average value are taken as the desired wavelength subintervals.

In this embodiment, the SERS spectrum of the small-molecule volatile substance is divided to obtain n wavelength subintervals. The n wavelength subintervals are sampled through weighted bootstrap sampling (WBS) to obtain W wavelength subintervals. A desired wavelength subset is obtained based on the desired wavelength subintervals. It ensures that the wavelength subintervals of SERS spectrum are still evaluated by WBS algorithm in the next iteration, so as to enable the correlation between the previous sampling results and the subsequent sampling results, and avoid the sampling results from converging to a local minimum. In this way, the valuable light waves can be accurately sampled, thus improving the detection accuracy of small-molecule volatile substance.

In this application, the evaluation parameters can be root mean square error of calibration set (RMSEC), root mean square error of cross validation (RMSECV), root mean square error of prediction set (RMSECV). root mean square error of prediction set, RMSEP), coefficient of determination of calibration set ($R_C^2$), or the coefficient of determination of prediction set ($R_P^2$).

Figure 8:
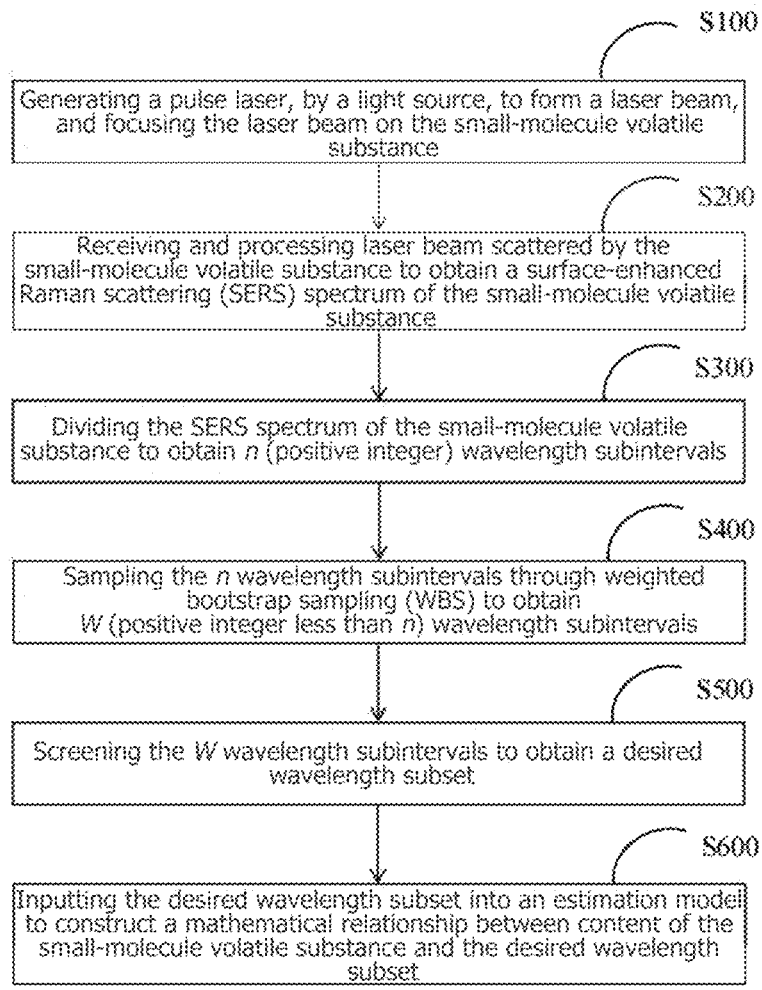
FIG. 8 is a flow chart of a rapid detection method of a small-molecule volatile substance according to an embodiment of this application.

Referring to an embodiment shown in FIG. 8, a rapid detection method for a small-molecule volatile substance is provided. The rapid detection method is applied to a server, and is specifically performed through the following steps.

(S100) A light source generates a pulse laser to form a laser beam, and focuses the laser beam on the small-molecule volatile substance.

Specifically, a user may use the pulsed laser device in the light source module in the Raman spectrum detection device to generate a pulse laser.

(S200) Laser beam scattered by the small-molecule volatile substance is received and processed to obtain a surface-enhanced Raman scattering (SERS) spectrum of the small-molecule volatile substance.

Specifically, the user can acquire the SERS spectrum of the small-molecule volatile substance via the Raman spectrum detection device. The Raman spectrum detection device sends the SERS spectrum to the server. The server receives the SERS spectrum sent by the Raman spectrum detection device, and pre-processes the SERS spectrum.

The server pre-processes the SERS spectrum by using methods for data smoothing and noise filtering, such as wavelet analysis, adaptive filtering, orthogonal signal correction method and differential processing to obtain the processed SERS spectrum. Through this step, the received SERS spectrum can be pre-processed to filter out interfering information (such as SERS spectral noise), so as to improve the accuracy and precision of the test.

(S300) The SERS spectrum of the small-molecule volatile substance is divided to obtain n wavelength subintervals, where n is a positive integer.

Specifically, the user can acquire the SERS spectrum of the small-molecule volatile substance via the Raman spectrum detection device. The Raman spectrum detection device sends the SERS spectrum to the server. The server receives the SERS spectrum sent by the Raman spectrum detection device, and divides the wavelength interval of the SERS spectrum into n wavelength subintervals of equal width.

(S400) The n wavelength subintervals are sampled through weighted bootstrap sampling (WBS) to obtain W wavelength subintervals, where W is a positive integer less than n.

Specifically, WBS is a random sampling method with put-back. Each time when WBS is executed, the object to be sampled is assigned a weight. If the weight is larger, it indicates that the probability of the object being sampled is also larger. The WBS is employed to sample n wavelength subintervals with equal width for n times (at a first iteration, each wavelength subinterval is sampled with a weight of 1/n). The wavelength subintervals that are sampled at least 1 time (the number of the wavelength subintervals is 0.632*n) are formed into a new wavelength subinterval. The WBS is repeated to obtain W wavelength subintervals.

(S500) The W wavelength subintervals are screened to obtain a desired wavelength subset.

(S600) The desired wavelength subset is input into an estimation model to construct a mathematical relationship between content of the small-molecule volatile substance and the desired wavelength subset.

Figure 7:
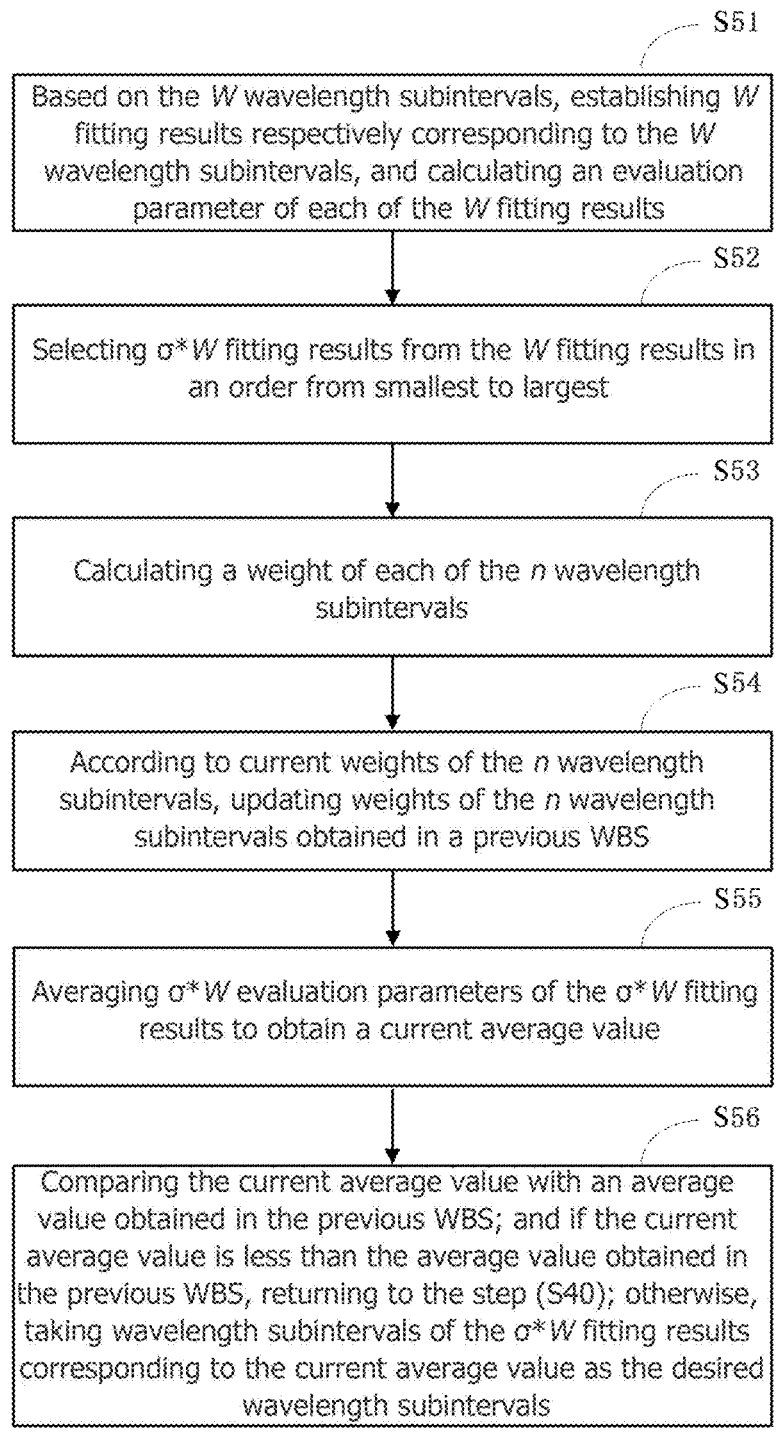
FIG. 7 is a flow chart of screening process according to an embodiment of this application.

As shown in FIG. 7, step (S500) is specifically performed throng the following steps.

(S501) Based on the W wavelength subintervals, W fitting results respectively corresponding to the W wavelength subintervals are established. An evaluation parameter of each of the W fitting result are calculated.

(S502) σ*W fitting results are selected from the W fitting results in an order from smallest to largest.

(S503) A weight of each of the n wavelength subintervals is calculated through the following equation:

$$P_i = \frac{D_i}{\sigma * W};$$

where $P_i$ represents a weight of an i-th wavelength subinterval; $D_i$ represents a frequency of the i-th wavelength subinterval appearing in the σ*W fitting results; σ is a preset ratio; and i=1, 2, ..., n.

(S504) According to current weights of the n wavelength subintervals, weights of the n wavelength subintervals obtained in a previous WBS is updated.

(S505) An average value of σ*W evaluation parameters is calculated to obtain a current average value.

(S506) The current average value is compared with an average value of evaluation parameters in the previous WBS. If the current average value is less than the average value obtained in the previous WBS, return to the step (S40). Otherwise, wavelength subintervals of the σ*W fitting results corresponding to the current average value are taken as the desired wavelength subintervals.

In step (S600), the mathematical relationship is a novel learning algorithm. In the mathematical relationship, the output of each convolutional layer is directly associated with a small input region. The mathematical relationship is obtained through a training that adopts an adaptive moment estimation algorithm. The adaptive moment estimation algorithm employs a cross-entropy error loss function as an objective function, as shown in the following equation:

$$O = \frac{1}{M}\sum_{m=1}^{M}\left[X_m \log \tilde{X}_m + (1-X_m)\log(1-\tilde{X}_m)\right] + \partial\|\theta\|^2;$$

where M indicates the number of samples; $X_m$ represents a target category; $\tilde{X}_m$ represents a predicted category; $\partial$ indicates a regularization coefficient; and θ indicates a weight.

The mathematical relationship is a novel learning algorithm for one-dimensional spectral signal processing. Compared with existing mathematical relationships, the mathematical relationship provided herein takes the spatial information of SERS spectrum into consideration. In the mathematical relationship provided herein, by enhancing the local connectivity ways between neighboring neurons, the local correlations of original SERS spectra are studied based on the spatial local correlations, and the risk of overfitting is reduced by using a weight-sharing method. In this embodiment, the mathematical relationship has enormous advantages in signal extraction and characteristic learning. Thus, the mathematical relationship is more suitable for highly sensitive detection of the content of the small-molecule volatile substance.

Figure 9:
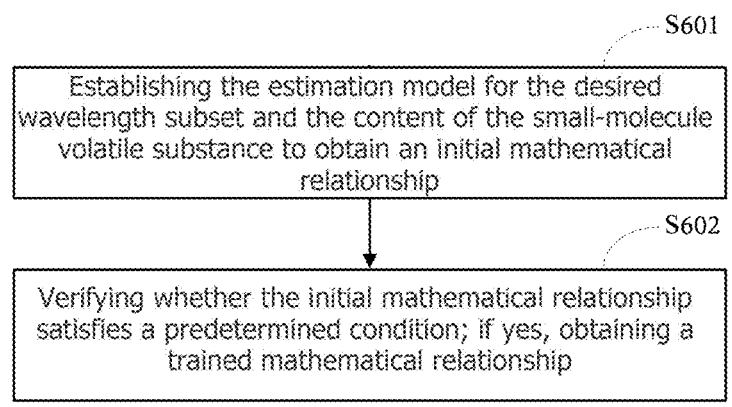
FIG. 9 is a flow chart of training of mathematical relationship according to an embodiment of this application.

It can be understood that in this embodiment, "rapid" means that the detection results can be obtained within 5-10 seconds. Referring to an embodiment shown in FIG. 9, step (S600) is specifically performed through the following steps.

(S601) The estimation model for the desired wavelength subset and the content of the small-molecule volatile substance is established to obtain an initial mathematical relationship.

(S602) Whether the initial mathematical relationship satisfies a predetermined condition is verified; if yes, a trained mathematical relationship is obtained. Specifically, the user can collect the SERS spectrum of the small-molecule volatile substance by a Raman spectrum detection device. The Raman spectrum detection device detects the content of the small-molecule volatile the via a gas chromatograph. The Raman spectrum detection device sends the content of the small-molecule volatile substance to a server. The SERS spectrum is input into the initial mathematical relationship to obtain the content of small-molecule volatile corresponding to the SERS spectrum. The detected content of the small-molecule volatile substance is compared with the content of the small-molecule volatile obtained from the initial mathematical relationship to obtain a comparison result. When the comparison result meets a preset requirement, it indicates that the initial mathematical relationship can accurately obtain the SERS spectrum corresponding to the content of the small-molecule volatile. The training of the novel learning algorithm is stopped and the trained mathematical relationship is obtained.

Embodiment 2

Figure 10:
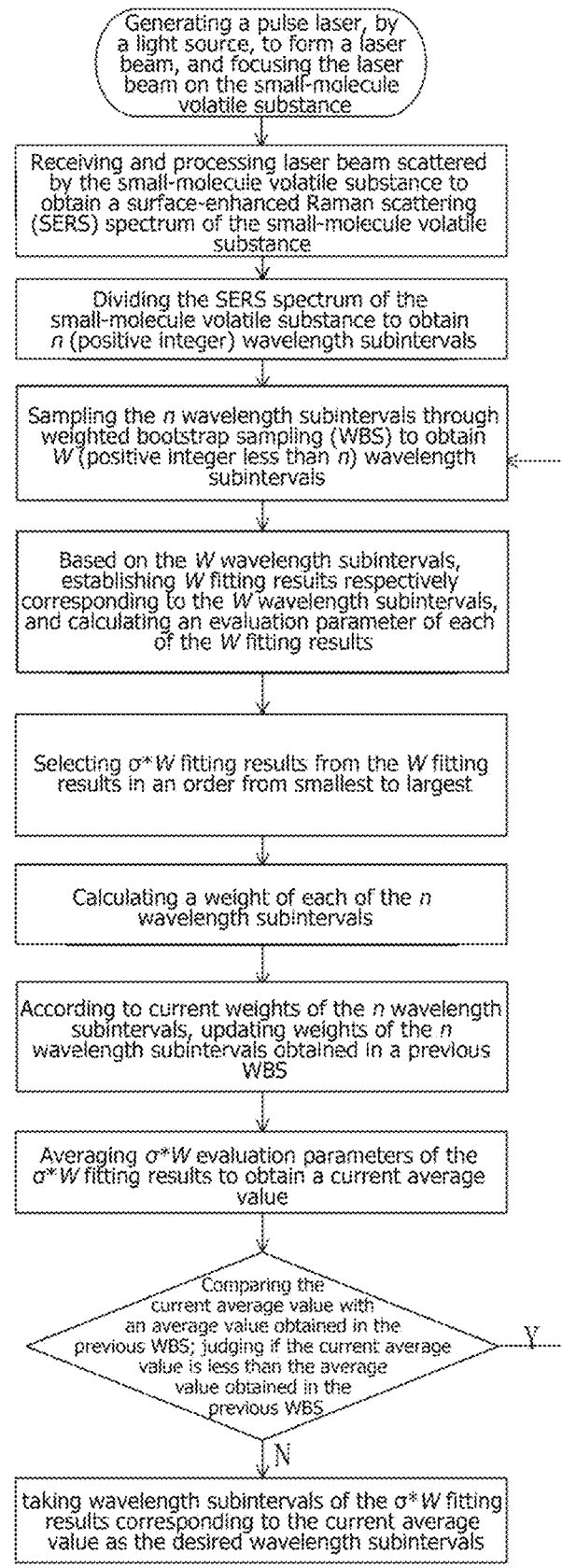
FIG. 10 is a flow chart of a characteristic information extraction method of a small-molecule volatile substance according to another embodiment of this application.

Referring to an embodiment shown in FIG. 10, provided herein is a characteristic information extraction method of a small-molecule volatile substance, which is performed as follows.

(Step 1) A light source generates a pulse laser to form a laser beam, and focuses the laser beam on the small-molecule volatile substance.

(Step 2) Laser beam scattered by the small-molecule volatile substance is received and processed to obtain a surface-enhanced Raman scattering (SERS) spectrum of the small-molecule volatile substance.

(Step 3) The SERS spectrum of the small-molecule volatile substance is divided to obtain n wavelength subintervals, where n is a positive integer.

(Step 4) The n wavelength subintervals are sampled through weighted bootstrap sampling (WBS) to obtain W wavelength subintervals, where W is a positive integer less than n.

(Step 5) Based on the W wavelength subintervals, W fitting results respectively corresponding to the W wavelength subintervals are established. An evaluation parameter of each of the W fitting result are calculated.

(Step 6) σ*W fitting results are selected from the W fitting results in an order from smallest to largest.

(Step 7) A weight of each of the n wavelength subintervals is calculated through the following equation:

$$P_i = \frac{D_i}{\sigma * W};$$

where $P_i$ represents a weight of an i-th wavelength subinterval; $D_i$ represents a frequency of the i-th wavelength subinterval appearing in the σ*W fitting results; σ is a preset ratio; and i=1, 2, ..., n.

(Step 8) According to current weights of the n wavelength subintervals, weights of the n wavelength subintervals obtained in a previous WBS is updated.

(Step 9) An average value of σ*W evaluation parameters is calculated to obtain a current average value.

(Step 10) The current average value is compared with an average value of evaluation parameters in the previous WBS. If the current average value is less than the average value obtained in the previous WBS, return to (step 4). Otherwise, wavelength subintervals of the σ*W fitting results corresponding to the current average value are taken as the desired wavelength subintervals.

Compared with the general soluble substances, the small-molecule volatile substances are more complex in the vibration form, including asymmetric stretching vibration $v_{as}$, symmetric stretching vibration $v_s$, and scissoring vibration $\delta_s$, rocking vibration $\delta_r$, wagging vibration $\delta_w$, twisting vibration $\delta_t$, and deformation vibration of ring. Additionally, in terms of binding with the substance on the reaction substrate, the gaseous substance is different from the liquid substance. When the object to be detected is a soluble molecule, the scattering cross section of the soluble molecule to be measured is large, and can effectively approach the SERS active substrate. However, the small-molecule volatile substances have small scattering cross sections, low Raman activity and many interferences. Therefore, it is more difficult to directly achieve the highly sensitive-selective detection of the small-molecule volatile substance. In this case, this application provides a feasible approach to deal with this problem, which can not only accurately detect the content of the small-molecule volatile substance, but also achieve the rapid detection.

Described above are merely preferred embodiments of this application, which are not intended to limit the present application. It should be understood that any equivalent structural transformation obtained based on the description and accompanying drawings of this application, or directly/indirectly applied in other related technical fields without departing from the spirit of the application shall fall within the protection scope of this application defined by the appended claims.

What is claimed is:

1. A detection system for a small-molecule volatile substance, comprising:
 a surface-enhanced Raman scattering (SERS) response medium;
 a reaction device;
 a Raman spectrum detection device; and
 a server;
 wherein the SERS response medium is configured to enhance a Raman scattering intensity of the small-molecule volatile substance;
 the reaction device is configured to allow the small-molecule volatile substance and the SERS response medium to react thereon;
 the Raman spectrum detection device is configured to collect a SERS spectrum of the small-molecule volatile substance after a reaction between the small-molecule volatile substance and the SERS response medium, and send the SERS spectrum to the server;
 wherein the Raman spectrum detection device comprises:
 a light source module;
 a light path module;
 a signal processing module; and
 a control module;
 the control module is in wire connection with the light source module, the light path module and the signal processing module;
 the light source module comprises a semiconductor laser and a pulsed laser device; and the pulsed laser device is configured to generate a pulse laser and transmit the pulse laser to the light path module;
 the light path module comprises an attenuation assembly, a beam expansion-shaping assembly and a collection assembly;
 the signal processing module comprises a spectrometer and a detector;
 the control module comprises a time-sequence controller; the time-sequence controller is connected to the pulsed laser device and the detector, and is configured to adjust the pulsed laser device and the detector, so as to realize synchronization between a pulse time sequence of the pulsed laser device and a shutter time sequence of the detector;
 the server is signally connected to the Raman spectrum detection device; and the server is configured to perform a detection method for the small-molecule volatile substance through steps of:
 (1) generating the pulse laser, by the pulsed laser device, to form a first laser beam, and focusing the first laser beam on the small-molecule volatile substance;
 (2) receiving and processing a second laser beam scattered by the small-molecule volatile substance to obtain the SERS spectrum of the small-molecule volatile substance;
 (3) dividing the SERS spectrum of the small-molecule volatile substance to obtain n wavelength subintervals, wherein n is a positive integer;
 (4) sampling the n wavelength subintervals through weighted bootstrap sampling (WBS) to obtain W wavelength subintervals, wherein W is a positive integer less than n;
 (5) screening the W wavelength subintervals to obtain a desired wavelength subset; and
 (6) inputting the desired wavelength subset into an estimation model to construct a mathematical relationship between content of the small-molecule volatile substance and the desired wavelength subset.

2. The detection system of claim 1, wherein the small-molecule volatile substance has a relative molecular weight ranging from 15-500 Da; and the small-molecule volatile substance is in a gaseous state at room temperature.

3. The detection system of claim 1, wherein the reaction device comprises:
 a base film; and
 a hydrophobic layer;
 wherein the base film is configured to receive the small-molecule volatile substance and the SERS response medium at different zones of the base film; the hydrophobic layer is configured to guide the small-molecule volatile substance and the SERS response medium to a reaction position on the base film, so as to allow the small-molecule volatile substance and the SERS response medium to react on the reaction position.

4. The detection system of claim 3, wherein the base film comprises a first zone, a second zone and a third zone; wherein the first zone and the second zone are connected to the third zone;
 the first zone is configured to absorb the small-molecule volatile substance dropwise added thereto; the second zone is configured to absorb the SERS response medium dropwise added thereto; first sides of the first zone, the second zone and the third zone are covered by the hydrophobic layer such that the small-molecule volatile substance in the first zone and the SERS response medium in the second zone are guided to the third zone for reaction; second sides of the first zone, the second zone and the third zone are not covered by the hydrophobic layer, such that the small-molecule volatile substance is dropwise added to a second side of the first zone, and the SERS response medium is dropwise added to a second side of the second zone.

5. The detection system of claim 4, wherein the first zone, the second zone, and the third zone of the base film are arranged in a triangular shape.

6. The detection system of claim 4, wherein the reaction device is a paper-based microfluidic chip; and the first zone, the second zone and the third zone each comprise a paper-based microfluidic hydrophilic channel.

7. The detection system of claim 1, wherein the attenuation assembly comprises:
 a Glan-laser prism polarizer; and
 a half-wave plate;
 wherein the half-wave plate is rotatable; the half-wave plate is configured to receive the pulse laser generated from the pulsed laser device, change a polarization angle of the pulse laser to obtain a changed pulse laser, and send the changed pulse laser to the Glan-laser prism polarizer; and
 the Glan-laser prism polarizer is configured to receive the changed pulse laser, split the changed pulse laser to obtain horizontally-polarized light, and send the horizontally-polarized light to the beam expansion-shaping assembly.

8. The detection system of claim 7, wherein the beam expansion-shaping assembly comprises:
 a diaphragm;
 a concave lens; and
 a convex lens;
 wherein the concave lens and the convex lens are movable; the diaphragm is configured to receive the horizontally-polarized light from the Glan-laser prism polarizer, filter the horizontally-polarized light to obtain a first circular light beam, and send the first circular light beam to the concave lens; the concave lens is configured to receive and diverge the first circular light beam to obtain a second circular light beam, and send the second circular light beam to the convex lens; and the convex lens is configured to receive and adjust the second circular light beam to obtain a target circular light beam, and send the target circular light beam to the collection assembly.

9. The detection system of claim 1, further comprising:
 a terminal;
 wherein the terminal is signally connected to the server; the terminal is configured to send a query request to the server for a detection result of the small-molecule volatile substance; the server is configured to generate a query result according to the query request, and send the query result to the terminal; and the terminal is further configured to display the detection result of the small-molecule volatile substance according to the query result.

10. The detection system of claim 9, wherein the server comprises a SERS spectrum cloud analysis platform; the SERS spectrum cloud analysis platform is configured to store the SERS spectrum and a source program of the detection method; the server is configured to provide an internet protocol (IP) address and a listening port for the terminal to request access, so as to allow the terminal to query historical SERS spectrum data and update the source program of the detection method from the SERS spectrum cloud analysis platform via the IP address and the listening port.

11. The detection system of claim 1, wherein the SERS response medium is a bridged complex; the bridged complex comprises a bridging ligand and a metal ion; and the bridging ligand has a reaction site for the metal ion.

* * * * *